Oct. 20, 1942.  W. P. YANT  2,299,520
METHOD OF MAKING EXTENSIBLE CONDUIT
Filed Feb. 28, 1940   2 Sheets-Sheet 1
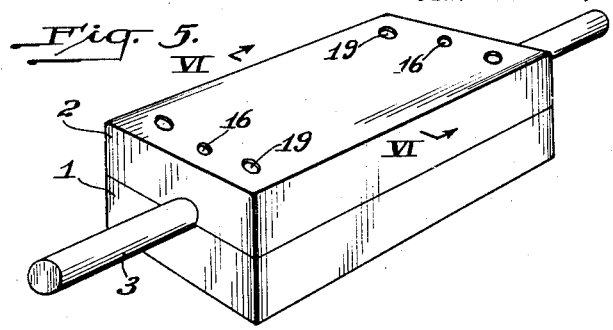
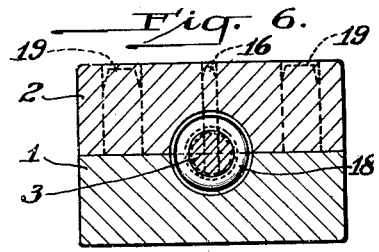
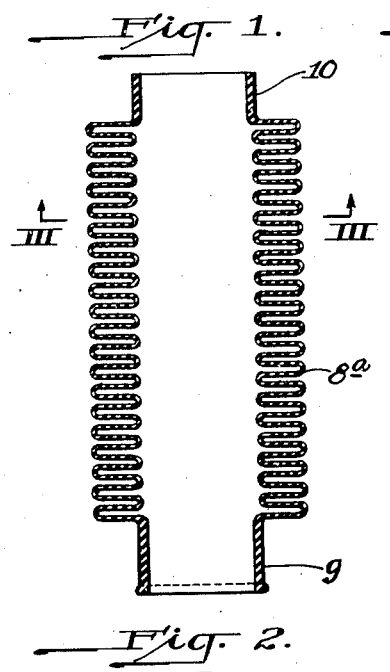
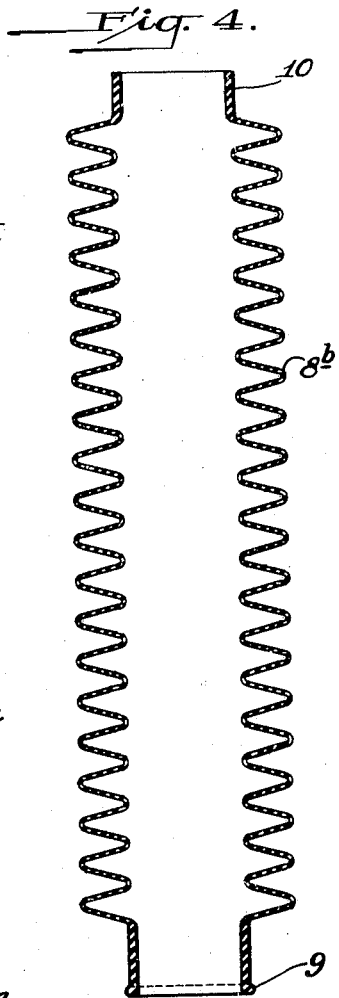
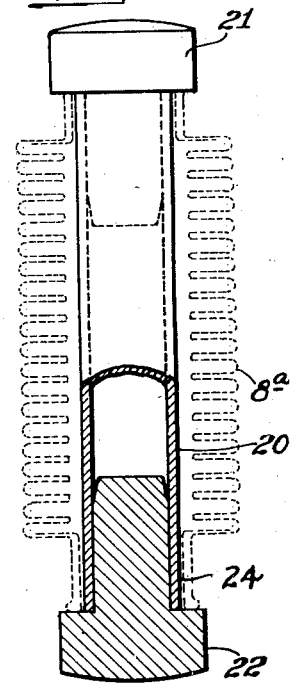
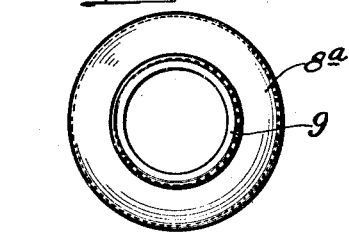
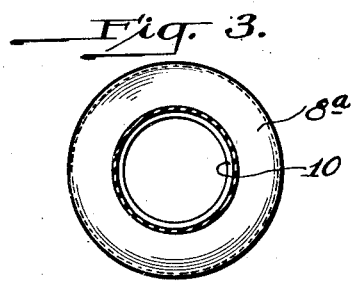
INVENTOR.
WILLIAM P. YANT
BY Frank E. Foote
his ATTORNEY.

Oct. 20, 1942.   W. P. YANT   2,299,520
METHOD OF MAKING EXTENSIBLE CONDUIT
Filed Feb. 28, 1940   2 Sheets-Sheet 2
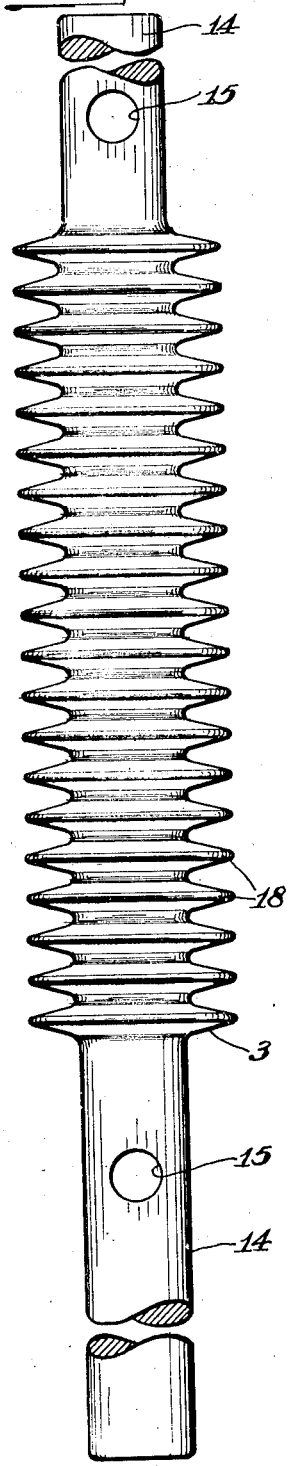
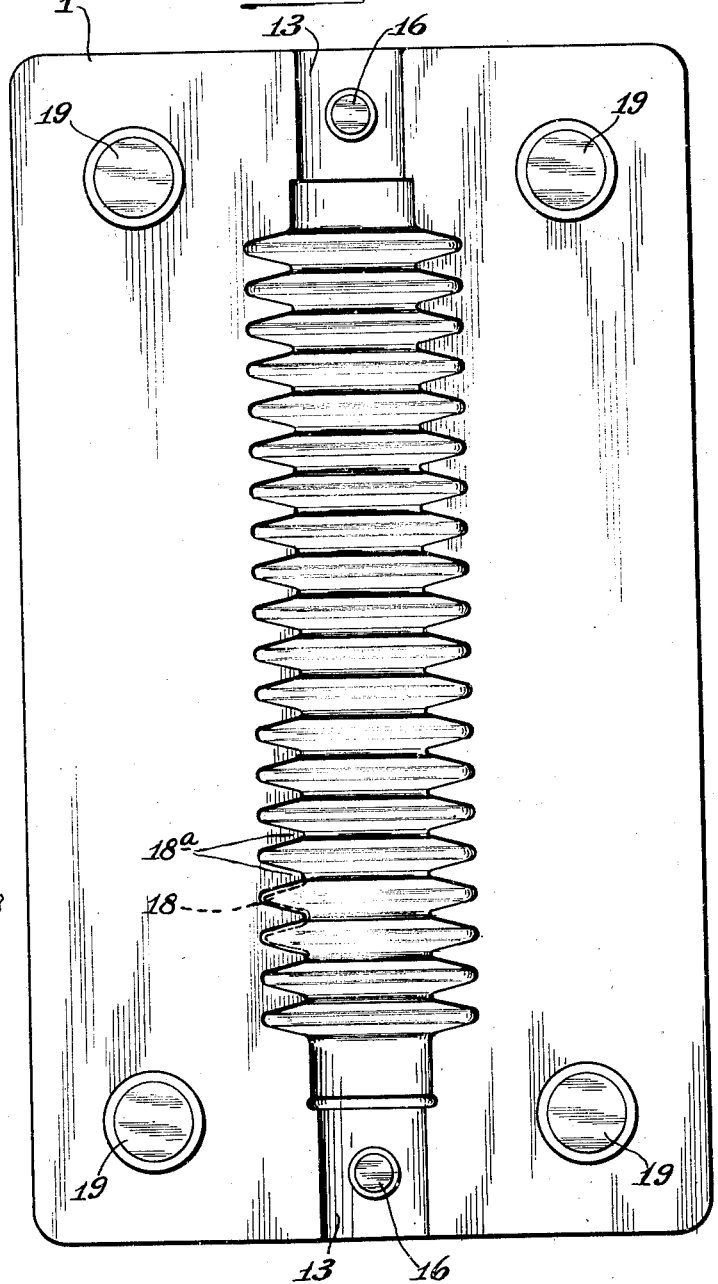
INVENTOR.
WILLIAM P. YANT
BY Frank E. Foote
his ATTORNEY.

Patented Oct. 20, 1942

2,299,520

UNITED STATES PATENT OFFICE 2,299,520

METHOD OF MAKING EXTENSIBLE CONDUIT

William P. Yant, Pittsburgh, Pa., assignor to Mine Safety Appliance Company, Pittsburgh, Pa.

Application February 28, 1940, Serial No. 321,181

11 Claims. (Cl. 18—56)

This invention relates to an improvement in the method of manufacturing a corrugated or accordion pleated conduit of formable and flexible material.

In order to provide a conduit or tube which is sufficiently flexible and adaptable for fluidly connecting the several parts of a breathing apparatus, tubing has been constructed with a side wall in the form of corrugations so that a tube section is readily extensible in its length and either end of the section can be readily moved in relation to the other without causing collapse or limiting the passage within the tube and without requiring undue effort on the part of a wearer of the apparatus.

It has been found that if the lateral sides of the corrugations relative to the longitudinal axis of the tube can be brought into closer proximity than has been done previously, the tube is made more extensible from a normal position and it possesses even greater flexibility so that it is rendered more suitable for respiratory use.

With conventional molding practice, a limit is reached in molding the lateral sides close together due to the difficulty and expense of providing mold pieces and cores which have the necessary mold surface contour and which can withstand without distortion the temperatures and pressures used in forming and vulcanizing material.

It is among the objects of this invention to provide a simple and inexpensive method of manufacture of a conduit or tube of relatively thin flexible material and having a side wall formed of corrugations spaced closely together and of material of uniform thickness and which is adaptable to the conventional method in present use of molding rubber material.

It is a more specific object of this invention to provide a method of manufacture of a closely spaced corrugated conduit which is to be made of relatively thin material and which is adaptable for use in breathing apparatus for connecting the facepiece with the rest of the apparatus and which is sufficiently light and flexible to limit effort on the part of the wearer in moving to extreme positions.

It is a more specific object of this invention to provide a breathing tube and to a method of manufacture which contains a thin wall of flexible material and is made of corrugations closely spaced so as to provide increased extension and flexibility for the lateral extent of corrugation used.

Other objects of this invention will become apparent from the specification and the drawings in which:

Fig. 1 is a sectional view of the conduit manufactured by my method and illustrating the conduit in its normal contracted condition.

Fig. 2 is an end elevation of the conduit illustrated in Fig. 1.

Fig. 3 is a sectional view taken along the line 3—3 of Fig. 1.

Fig. 4 is a sectional view of conduit illustrating one step in my method of manufacture.

Fig. 5 is a perspective view illustrating the customarily used mold pieces and core piece used in the manufacture of articles of formable material.

Fig. 6 is a sectional view taken along the line 6—6 of Fig. 5.

Fig. 7 is a view partly in section of a mandrel showing in dotted lines the preformed conduit mounted on the mandrel and illustrating a step in my method of manufacture.

Fig. 8 is a view in elevation of the core piece used in forming the article illustrated in Fig. 4.

Fig. 9 is a view in elevation of the interior of the mold piece.

The conventional molding process followed in the manufacture of articles of rubber material by the application of heat and pressure employs usually two mold pieces such as illustrated in Figs. 5 and 6 and indicated as mold piece 1 and 2. In order to form an article having a passageway therethrough, as in the case of hose or tube manufacture, it is necessary to provide a core piece such as 3 illustrated in Figs. 5 and 8. Each of these pieces has a contour which is to define the molded shape of the material placed therein. In the case of molding corrugated tubing, the molding surfaces have a shape as illustrated in Figs. 8 and 9, and it is apparent that projections 18 of core piece 3 cooperating with projections 18a of mold piece 1 and like projections on mold piece 2, Fig. 9, construct the corrugations of the manufactured conduit. Since conduit for some purposes is to be made of relatively thin material, it is necessary that the complementary surfaces of the core and mold pieces be rather closely spaced, as indicated in Fig. 9 by the relative position of a portion of the surface of the core and a cooperating surface of the mold piece 2.

Consequently, the flexibility and extensibility of this type of tube is due to the nature of the corrugation and because of the limits of conventional molding these properties are dependent upon the lengths of the corrugations, that is, they may be increased by increasing the length, or lateral extents relative to the length of this conduit, of the triangular shaped projection or corrugation. However, if the sides of each corrugation could be disposed closely together, this would increase the flexibility as well as increase the amount of extensibility of a unit of the tube, and this latter property is very desirable in breathing apparatus because it reduces the overall length of the tube necessary to accommodate movements of the wearer during use of the apparatus. Conventional molding limits the extent to which the sides of each corrugation can be brought together because the projection of the mold providing each corrugation must be made sufficiently strong to undergo, without distortion, the heat and pressure of molding and without increasing the expense of making the mold surface of each member of the mold beyond that which is practical.

With my invention, the formerly used mold and core pieces are utilized and with the result that a tubing can be produced of relatively thin material with the lateral sides of corrugations spaced approximately adjacent to each other and extending almost at right angles to the axis of the conduit 8a, Fig. 1. When used in breathing apparatus, this construction allows more free movement of each end of the conduit relative to the other and reduces strain on the wearer of the apparatus and does not interfere with the breathing passage of the conduit nor increase the resistance to flow of air.

By this new method, the ordinary molding procedure is followed initially in using two mold pieces, Figs. 5 and 6, and as more completely illustrated in Fig. 9 in which the mold surface defines the exterior of a conduit comparable to that as illustrated in Fig. 4 and identified as 8b. Heat may be supplied to the mold cavity by means of heated platens (not shown) being brought into engagement with surfaces of the mold pieces, or fluid cavities can be provided in the mold pieces and to which a source of heat can be connected. Each extremity of each mold piece has a suitable opening 13 for accommodating the ends 14 of core 3. The base mold piece 1 has pins 19 therein and which are accommodated by openings in the upper member 2 to position and hold the mold pieces in proper molding position. The core member 3 has openings 15 at each end for holding the core in its proper position by engagement with pins 16 of the mold member 1. All of this structure has been used previously in the molding of conduit having the configuration as illustrated in Fig. 4, and it is a feature of this invention that my method is adaptable to the use of this available equipment.

In the practice of the method, calendered rubber flat sheet material of about the thickness of the conduit to be formed is inserted in the lower mold piece 1 and then the core piece 3 is placed in position followed by the addition of sufficient rubber material to fill the mold whereupon the top mold piece 2 is placed in position and then sufficient heat and pressure is applied to shape the material and start its setting. The heat and pressure are continued for such a period of time that the rubber material becomes set only sufficiently so that it can be removed from the mold and inserted on the mandrel illustrated in Fig. 7. It has been found in one application of my invention that using rubber material of approximately 1/16" in thickness in the manufacture of a corrugated conduit of about 1" in diameter, sufficient heat is applied by subjecting the mold to a temperature of about 209° F. for a period of about five minutes to give the material the set necessary for removing it from the mold. It is intended by this operation that that amount of heat be applied which is necessary only to pre-set the material to the shape of the mold and sufficient that the pre-set material can be removed without affecting the shape and also allow for a sufficient reserve of unreacted vulcanization material so that the material can be permanently set subsequently.

After the material has been removed from the mold it is positioned onto a mandrel 24 which is constructed merely of a hollow cylinder 20 having removable caps or plugs 21 and 22 at each end to engage ends 9 and 10 of the conduit, the tube 20 being of a length dependent on the desired configuration and length desired of the finished conduit. The caps can be fitted rather loosely to the cylinder 20 in case of the manufacture of breathing tubes since the material at this stage of the process possesses little resilience. However, this will depend upon the article to be produced since in some cases if heavier material is used it may be necessary to apply additional tension on the two caps so as to retain them in position. The material removed from the mold has a configuration similar to conduit 8b illustrated in Fig. 4 in which the apex or tip and the sides of the corrugations are spaced at a distance greater than that as desired, and in the practice of my method, the tube in this shape is to be merely pre-set so that it can be changed to a different contour by the application of a limited pressure and then subsequently permanently set to the configuration illustrated in Fig. 1 by the application of heat. With the 1/16" material, it has been found that sufficient heat is applied to permanently set or cure the material by using steam at 60 lb. pressure and for a period of about 15 minutes.

After the material has been sufficiently set in the mold, it is advisable to apply soapstone material to the outer surface and then wrap with cotton cloth material. This protection prevents the cohesion or sticking of the surfaces of adjacent corrugations and permits ease in handling.

The size of the tube 20 of the mandrel 24 must be of a diameter somewhat less than the diameter of the tube in order to apply steam under pressure to the inside and the outside of the tube in completing the curing and thus eliminate any collapsing of the corrugations during the treatment. This also prevents any distortion of the conduit material in placing the tube on the mandrel, and also eliminates any probability of warping of the corrugations due to any stress that may occur in inserting the tube in the passage of the conduit.

With the conduit in this condition permanently set, it is obvious that the conduit can be elongated to that as would be possible should the configuration be that as illustrated in Fig. 4 which represents the pre-set condition of the corrugations of this type of conduit. Furthermore, the closely disposed corrugations, in addition to increased elongation, allow greater flexibility in the movement of an end of the conduit relative to the other and make it especially suitable for breathing apparatus where it is desired to position the canister as close as possible to the facepiece but at the same time permit complete freedom of motion of parts of the body and without collapse of the tubes or in any way limiting the breathing passage.

It is apparent that modifications can be made in the process as just described, and it is intended that this invention include any such modifications which include the manufacture of an expendible article which by reason of its configuration limits the extent of elongation possible by ordinary molding methods and which by my invention makes available a method of manufacture which conforms to or is adaptable to the present methods used in molding rubber materials to their final desired state. Also, the method is suitable especially for manufacture of material to be made of relatively thin materials and which it has been thought would prevent any possibility of utilizing a two-step method in curing rubber material. It has been thought that because of the limited set which should be given to the material before it is placed in its final state would cause a collapse of the corrugations, but it has been found that a pre-set can be given which is sufficient to maintain the corrugations and yet render them readily conformable by the application of pressure to a condition which disposes each of the corrugations closely adjacent to the other and by then subjecting them to the necessary amount of heat for a sufficient period cause the material to become permanently set and thus provide a conduit having the desired improved properties of extensibility and flexibility. This is more fully understood by comparing the configuration of the conduit 8b, Fig. 4, which represents a longitudinal extended position of the finished conduit, with that of the finished conduit 8a, Fig. 2.

Tubing suitable for breathing apparatus must be sufficiently flexible so that the conduit 8a which may be used to connect a facepiece to an air purifying canister is capable of being flexed so that end 9 can be moved around to be directed in a position like that of end 10 and without interfering with the passage defined by the wall of the conduit. By this invention, the tubing is sufficiently flexible even in a normal contracted position and it has the all important property of being much more extensible from a normal position than has heretofore been accomplished. Figs. 2 and 3 illustrate more fully the construction of the conduit 8a of Fig. 1.

It is to be understood that ordinary crude rubber representative of a resilient and yieldable thermosetting material is used in the manufacture of the conduit and preferably should be calendered in sheets of about the desired thickness so that the material will readily conform to the shape of the mold. Also, the amount of vulcanizing material and accelerator used should be that as ordinarily used in the vulcanization of rubber to give it a permanent set. It is suggested that the amount of the accelerator used should not be so great that it would effect a premature permanent set of the material. However, a limited amount of this material can be used and it is apparent that the amount to be used would be well known to those who are familiar with the vulcanization of rubber material.

While this invention has been described specifically in connection with the making of a tube or conduit suitable for breathing apparatus, it is to be understood that this in no way should limit the scope of the invention because it is recognized that tubing or conduit material can be made for other purposes and which require the characteristics of permanently set material made possible by my method. It is intended that the invention be limited only by the scope of the appended claims.

I claim:

1. A method of making a conduit of formable material and containing an extensible means integrally formed in the wall of the conduit, comprising the steps of molding formable material to provide a conduit with the extensible means disposed in a longitudinally extended position relative to its normal position, partially curing the material, disposing the extensible portion in its normal position, and retaining the portion in this position while completing curing of the material.

2. A method of making a conduit of formable material and containing an integral readily extensible means extending laterally of the length of the conduit, comprising the steps of molding formable material to provide a conduit with the integral extensible portion in a longitudinally extended position relative to its normal position, partially curing the material while in this position, contracting the extensible portion to its normal position, and retaining the portion in this contracted position while completing curing of the material to give a permanent set to the material.

3. A method of making a conduit of thermosetting material and containing an integral readily extensible portion extending generally in a lateral direction of the conduit and comprising the steps of molding thermosetting material with the extensible portion in a longitudinally extended position, partially curing the material, and compressing the portion to a normal contracted position and completing curing to give a permanent set to the material.

4. A method of making a conduit having a thin wall and a readily extensible means formed of a portion of the wall and extending laterally of the conduit and comprising the steps of molding thermosetting material to form a conduit with the extensible portion in a longitudinally extended position, partially curing the material, disposing the extensible portion in a normal longitudinally contracted position, and completing curing to give a permanent set to the material while retaining the extensible portion in its normal contracted position.

5. In the method of making a thin walled conduit having readily longitudinally extensible portions closely spaced and laterally projecting of the conduit and comprising the steps of molding thermosetting material to form a conduit with the extensible portions in an extended position relative to the normal position, partially curing the material, contracting the extensible portions to their normal position, and completing curing of the material to give a permanent set to the material while maintaining the extensible portions in their normal position.

6. In the method of making a conduit of moldable material and to contain in the wall and intermediate its ends readily extensible portions closely spaced longitudinally of the conduit and laterally extending of the conduit and comprising the steps of molding the material to form the conduit with the longitudinally spaced extensible portions in an extended position, partially curing the material, disposing the extensible portions so that the defining wall portions of each extensible portion are in close proximity to each other and completing curing of the material while maintaining the extensible portions in the disposed condition.

7. In the method of making a conduit of vulcanized rubber material and having a longitudinally yielding portion intermediate its ends and extending laterally of the conduit and with the inner faces of its sides normally disposed in close proximity to each other and comprising the steps of molding rubber material to form the conduit with the inner faces of the yielding portion spaced in excess of the normal position, partially curing the material, disposing the inner faces in their closed normal position and completing curing of the material to give a permanent set to the material while maintaining the extensible portion in its disposed condition.

8. The method of making a conduit of vulcanized rubber material and having a plurality of yielding portions in the wall and extending laterally of the length of the conduit and with the faces of adjacent portions being in close proximity to each other and comprising the steps of molding uncured rubber material to form the conduit with the faces of the yielding portions being spaced in excess of their normal contracted position, partially curing the material to give a temporary set to the material, disposing the faces in close proximity to adjacent faces and completing curing of the material while maintaining the extensible portions in their disposed contracted condition.

9. In the method of making a conduit of vulcanized rubber material and having yielding portions in the wall of corrugated shape extending laterally of the conduit and of substantial depth relative to the passage within the conduit and with the side portions of each corrugation being disposed in close proximity to each other and to the side portions of adjacent corrugations, and comprising the steps of molding rubber material to form the conduit with side portions of each corrugation formed in the wall being spaced in excess of their normal position and comparable to an elongated position of the conduit, curing the material sufficiently to give the material a temporary set for further processing, disposing the side portion of each corrugation in close proximity to each other and to the side portion of an adjacent corrugation and which is to be substantially the normal condition of the corrugated portion and completing curing while retaining the corrugations in this disposed condition sufficient to give the material a permanent set.

10. The method of making a conduit of vulcanized rubber material and having yielding portions in the wall of corrugated shape extending laterally of the conduit and of substantial lateral depth relative to the passage within the conduit and with the side portions of each corrugation being disposed in close proximity to each other and to the side portions of adjacent corrugations, and comprising the steps of molding uncured rubber material to form the conduit with the side portions of the corrugations being spaced in excess of their normal position and comparable to an elongated position of the conduit, curing the material sufficiently so as to give it a set only sufficient so that the material can be handled for further processing, disposing the conduit on a support and contracting the side portion of each corrugation in close proximity to an adjacent side portion and which is to be the normal condition of each corrugated portion and completing curing while retaining the corrugations in this disposed contracted condition sufficient to give the material a permanent set.

11. In the method of making a corrugated conduit of relatively thin vulcanized rubber material and with the corrugations being closely spaced along the length of the conduit and of substantial lateral depth relative to the passage of the conduit and with lateral portion of each corrugation being normally disposed in close proximity to an adjacent portion and comprising the steps of molding and partially curing by the application of heat and pressure rubber material to form the conduit with the lateral portion of each corrugation being spaced from an adjacent lateral portion and comparable to a longitudinally extended position of the conduit, the partial curing being sufficient merely to set the material so that the molded conduit can be removed from the mold and placed on a support, placing the molded conduit on a support, contracting the corrugations to dispose each lateral portion in its normal position and apply heat to the mass while maintaining the conduit in the normal contracted position.

WILLIAM P. YANT.